July 4, 1961 E. SAUER ET AL 2,990,758
PHOTOGRAPHIC CAMERAS
Filed Jan. 23, 1957 5 Sheets-Sheet 4

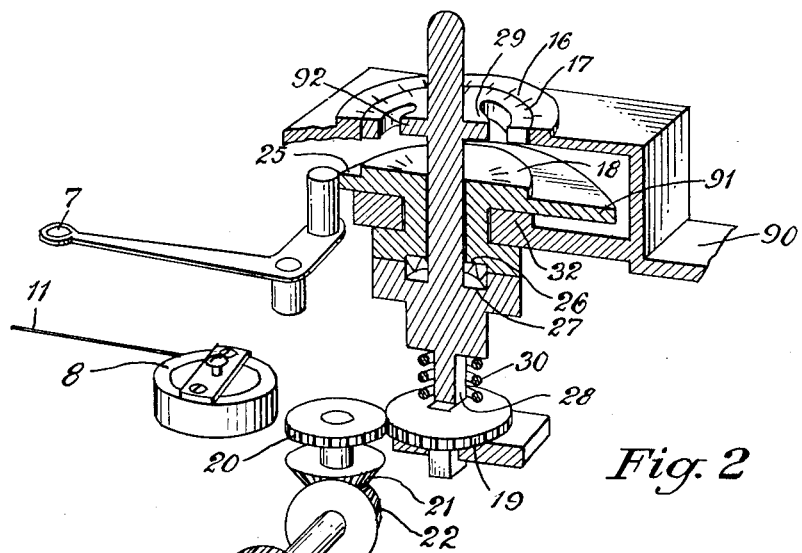
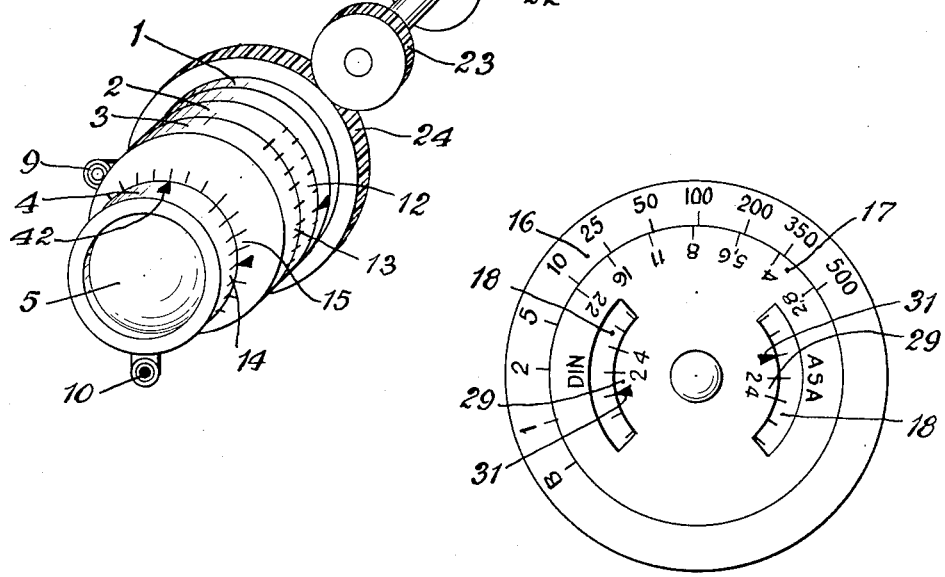
Fig. 2
Fig. 3

Inventors
Edgar Sauer
Hans Rühle
Otto Metzger
Johann Hahn

BY Singer, Stern & Carlberg
ATTORNEYS

Inventors
Edgar Sauer
Hans Rühle
Otto Metzger
Johann Hahn
by Singer, Stern & Carlberg
Attorneys

United States Patent Office 2,990,758
Patented July 4, 1961

2,990,758
PHOTOGRAPHIC CAMERAS
Edgar Sauer, Hans Ruhle, Otto Metzger, and Johann Hahn, Stuttgart, Germany, assignors to Zeiss Ikon A.G. Stuttgart, Stuttgart, Germany
Filed Jan. 23, 1957, Ser. No. 635,680
Claims priority, application Germany Jan. 24, 1956
15 Claims. (Cl. 95—10)

The invention relates to photographic cameras, including motion picture cameras, equipped with means for adjustment of the diaphragm, the shutter and the distance.

The operation of expensive high speed photographic cameras with powerful objectives requires a substantially higher degree of attention, ability and skill of the photographer than in the case of more conventional low cost cameras. With high-priced photographic cameras provided with high-speed lenses, substantially greater demands are made upon the skill and attention of the photographer than is the case with cameras of the low-price category. In some cases the pictures obtained by the unskilled amateur are of inconsistently low quality. It is, therefore, desirable to provide a photographic camera which has all the technical advantages of the high speed cameras but in which the operation is very much simplified so that the operation of these cameras will not require any more skill than required for operating a conventional box camera.

Investigations made on a large number of different types of photographic pictures have been made to ascertain empirically whether there exist certain relations between the diaphragm aperture, the shutter and the distance of the subject photographed from the camera. It was discovered that the proportion of photographs, the picture contents of which correspond to that of miniature photographs with an image relation higher than 1:100, i.e. with an exposure distance of less than 19.5 feet when using an objective with focal distance of 2 in. is relatively small. Further investigations for determining the relationship between diaphragm aperture, shutter speed and distance adjustments on the one hand, and the range of the depth of focus on the other hand, have shown that with most focal lengths used in miniature cameras these relationships follow relatively simple laws.

FIG. 1 shows a graph in which the values of light, shutter speed, diaphragm aperture and for the distance are illustrated as a function of angular adjustment of the respective adjustment rings when said rings are coupled with each other in predetermined positions. In the figure the angular adjustment of the rotatable adjusting rings for the diaphragm, shutter, light, and the range finder is plotted on the abscissa, while the values for light shutter speed, diaphragm aperture distance and the near point can be read off on the ordinate.

It will be observed that the intensity of light is a linear function of the angular displacement of the adjustment ring. The characteristics for the time (shutter speed) and diaphragm aperture are, however, so selected that in the right hand portion of the diagram, i.e., in the range of small diaphragm apertures only a relatively small increase of the diaphragm aperture takes place when the light values become smaller, so that the near point recedes only gradually from the objective; on the other hand, the shutter speed increases substantially in this range. It should also be noted that the ordinates of the light value in this selected arrangement are equal to the sum of the ordinates of the diaphragm and the shutter speed. In the left hand portion of the graph the diaphragm aperture increases very rapidly when the light values decrease, while at the same time the shutter speed increases very slowly so that when the lighting conditions are unfavorable a shutter speed of $\frac{1}{25}$ to $\frac{1}{30}$ of a second is indicated, and such a speed still permits the taking of snapshots with the camera held by hand.

In view of the foregoing it is an object of the invention to provide an improved photographic camera or motion picture camera which is provided with coupling means between the diaphragm, the shutter and the range adjusting means which will materially simplify the operation of the camera and in which coupling means in their operative position and when actuated in one direction will increase the diaphragm aperture, the shutter speed and the distance adjustment, and when actuated in the opposite direction will reduce these values.

Another object of the invention is the provision in a camera of coupling means between the adjusting means for the diaphragm aperture and the shutter speed on one hand and the adjusting means for the exposure meter on the other hand.

Another object of the invention is the provision in a camera of coupling means for automatic setting of the adjustment means for the diaphragm aperture and the shutter speed in dependence of the setting of the adjusting means for the exposure meter. As will be noted from the graph of FIG. 1, the relationship between the light intensity, the diaphragm aperture and shutter speed, is selected in such a manner that based on the numerous empirical discoveries there exists for each light value only one set of predetermined values of the shutter speed and diaphragm aperture. In combining the respective values of diaphragm aperture and shutter speed selected for different light values a characteristic is obtained, the course of which will assure that the picture of the subject disposed near the camera will have the required depth of focus. It will also permit the taking of snapshots without the necessity of employing a special support for the camera.

A still further object of the invention is the arrangement of the adjusting means for the diaphragm aperture and the shutter speed in such a manner that the relationship between the light intensity and the displacement of the coupled adjustment means for the diaphragm aperture is linear or at least approximately linear.

Still another object of the invention is the provision of appropriate stopping means which in cooperation with the adjusting means for the exposure meter, the diaphragm aperture and the shutter speed permits the operative engagement of the respective couplings between said elements only in one predetermined position of all three adjusting means relative to each other. Such an arrangement will eliminate the possibility of undesired engagement of one of the coupling means in a direction and position which will not correspond to the necessary adjustment of the respective elements relative to each other. The same applies to the adjustment means for the diaphragm aperture and the range finder. Also in such a case the present invention provides means which permit the coupling between these elements to be effected only in one predetermined position of said adjusting means which are positioned in the camera relative to the other elements in such a manner that the operation of the camera will not be disturbed. It will thus be possible to automatically operate the camera under most favorable conditions as determined by empirical investigation of experiments as shown in the graph of FIG. 1.

In accordance with one embodiment of the invention the indicating scales of the adjusting means for the shutter and the diaphragm aperture are arranged in such a manner that during their adjustment in a coupled condition in the range of small apertures of the diaphragm the change in the shutter speed will predominate while in the range of large diaphragm openings the change in the diaphragm itself will predominate. The relationship of the adjusting means for the diaphragm and the distance is preferably arranged in such a manner that the effective depth of focus will be in the range from a variable near point to the infinity in all positions of the respective adjusting means. When the diaphragm aperture and the distance increase the near point will recede from the objective only to such an extent as is required to maintain the infinity position of the distant point.

The displacement of the near point is preferably selected in such a manner that in case of the maximum values of the diaphragm aperture, the shutter speed and the distance with coupled adjusting devices, a line of six feet length and disposed in the plane of the near point at right angles to the optical axis will appear in the picture as a line not substantially smaller than the short side of the picture frame, i.e., in the case of small film size and an objective of approximately 2" focus, not less than about one inch. It is the function of the exposure meter and the time aperture and distance adjusting devices to obtain this picture relation and to achieve that in the taking of groups or portraits said objects remain within the range of sharp depth of focus.

The indicator and adjustment means of the exposure meter may in one embodiment of the invention be located in the viewing field of the viewer.

A particular form of the near point indicator may be obtained by having an indication mark on the distance scale cooperate with a stationary near point scale which, in turn, is provided with an adjustment mark associated with the distance scale.

The dependence of the light intensity at the object upon the distance in the case of artificial illumination means (flash lamps) may be taken into consideration through a diaphragm opening which varies with the square of the distance when the adjustment devices are coupled.

The foregoing objects are merely illustrative of the various objects of the present invention. Other objects and advantages will be apparent from a study of the following specification, when considered in conjunction with the accompanying drawings, which show by way of example two embodiments of the photographic camera of this invention.

In the drawings:

FIG. 2 shows a perspective, and partly a cross-sectional view of the adjusting means for the exposure meter, the shutter, the diaphragm and the distance setting means; also shown are the transmission gears, the film sensitivity indicating device and the exposure meter.

FIG. 3 shows the indication scales of the adjusting device for the diaphragm, the shutter, the film speed and the filter factors.

Figure 4:
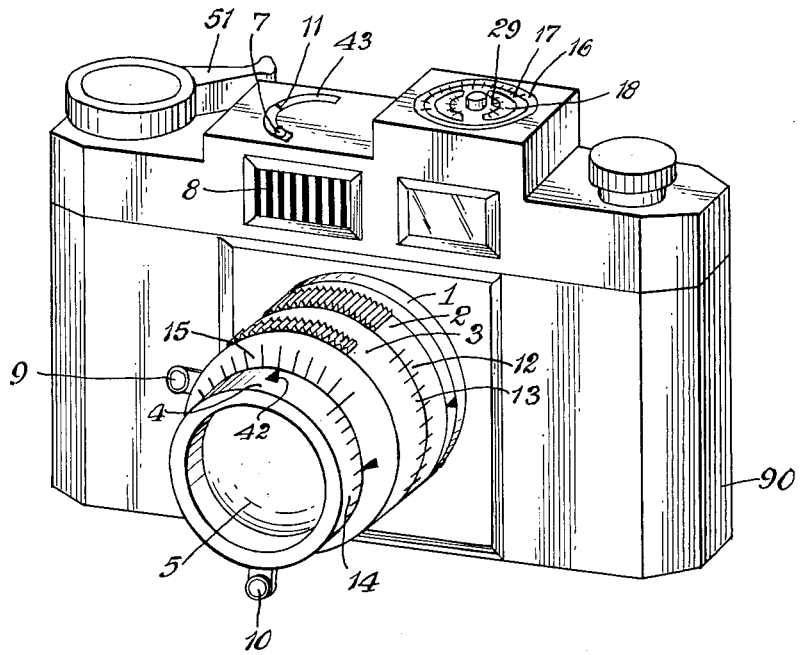
FIG. 4 is a perspective view of a photographic camera constructed in accordance with the present invention.
Figure 5:
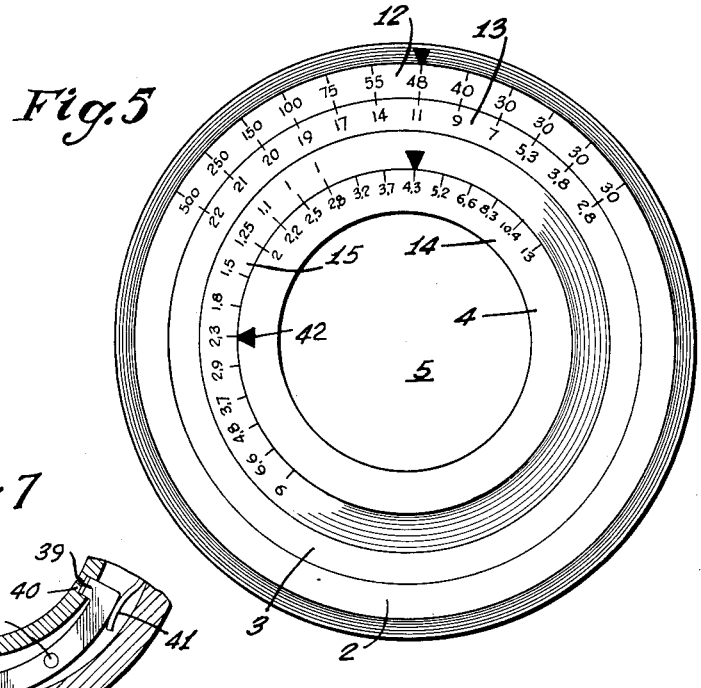
FIG. 5 illustrates the arrangement of the indicating scales on the adjusting devices for the shutter, the diaphragm, the distance setting means and the arrangement of the near point scale.

Referring to the drawings, and more particularly to FIGS. 2 and 4 thereof, the reference numerals 2, 3 and 4 designate the rotatably arranged adjusting rings for the shutter, the diaphragm and the distance setting means. These rings 2, 3 and 4 extend concentrically about the camera objective 5 which is mounted on the front wall of the camera housing 90. There are provided coupling means between the adjusting rings 2 and 3 and also between the adjusting rings 3 and 4 adjusting to correspond with the conditions of FIG. 1, and these coupling means are actuated by levers 9 and 10. When the coupling between the adjusting rings 2 and 3 is in operative position these adjusting rings are simultaneously rigidly connected with the adjustment device 1 of the follow-up indicator 7 of the exposure meter 8. The indicating scales 12, 13 and 14 provided on the adjusting rings 2, 3 and 4 are arranged in such a manner that when the respective couplings are in operative position the values as shown in the diagram in FIG. 1 will be correlated to each other. The follow-up indicator 7 of the exposure meter 8 is connected with the axially shiftable adjusting ring 1 by means of a mechanism including the gears 19 to 24. The mechanism also includes a time dial 16, a diaphragm dial 17, a film speed dial 18, the ratchet coupling 26, 27 and the cam 25. The disc 91 on which the film speed scale 18 is disposed is rigidly connected with the cam 25 which actuates the follow-up indicator 7 for the exposure meter indicator 11 and the upper part 26 of the ratchet coupling. The lower part 27 of said coupling is rigidly connected to a disc 92 carrying the dial 17 and is connected over a square shaft 28 with the gear 19.

Figure 1:
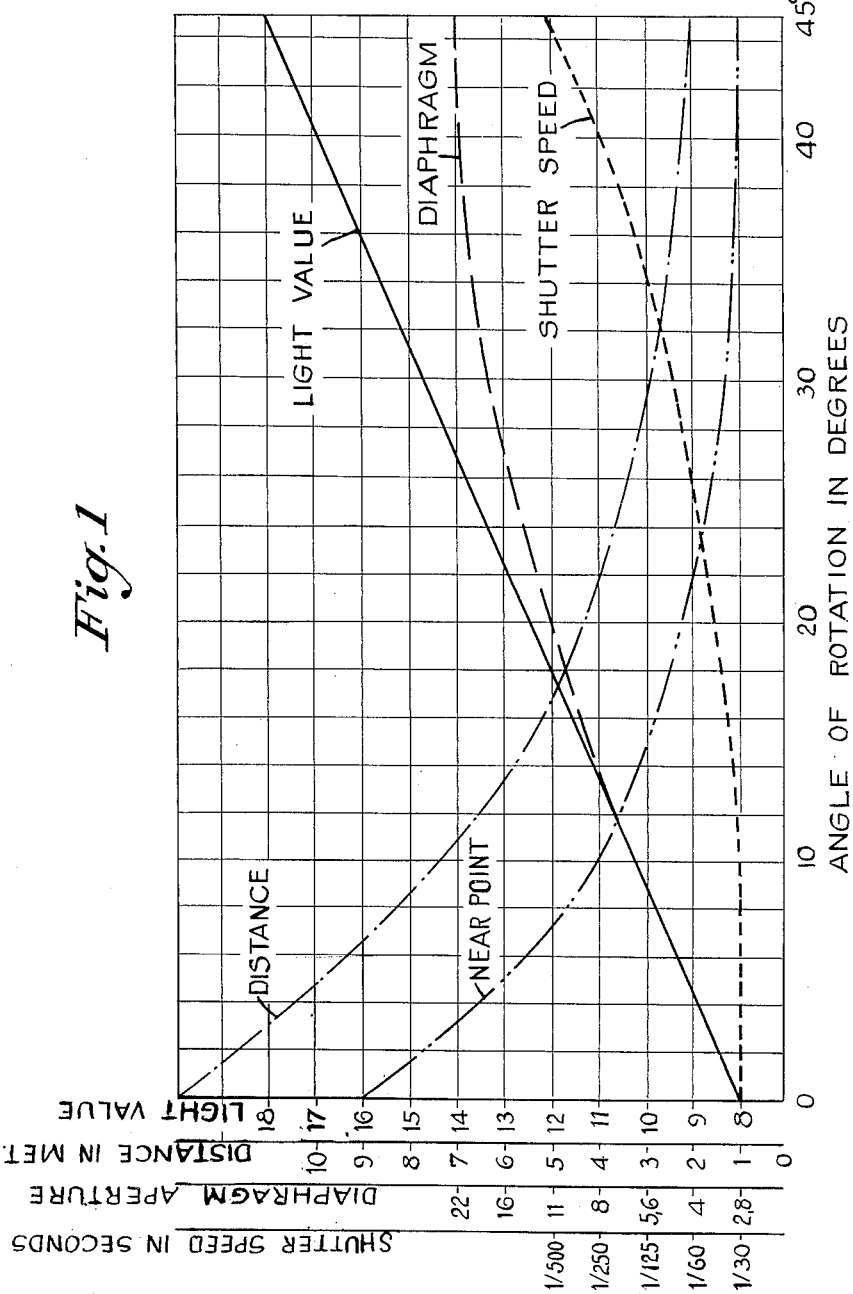
FIG. 1 is a diagram showing the mutual relationship of the values for the shutter speed, the diaphragm aperture, the distance, the near point and the light values. The range of the depth of focus in this case is located between a variable near point and a distant point located in infinity.

In Fig. 1, along the abscissa, the angle of rotation is indicated through which the adjusting ring 1 is rotated in order to bring the follow-up indicator 7 into registry with the exposure meter indicator 11. Along the ordinate the various values of light intensity, distance setting, diaphragm aperture, and shutter speed are indicated. The curves for light value, distance setting, diaphragm aperture, and shutter speed show what distance setting, diaphragm aperture, and shutter speed are required for various light values in order to achieve a good picture. In addition, the diagram contains a near point curve which together with the distance indications on the ordinate shows where the near point (measured from the objective) is located in dependence upon existing values of diaphragm aperture and distance setting. This near point is in each case the forward limit of the range of depth sharpness, the rearward limit of which is infinity. Therefore, a distant point curve cannot be shown in the diagram of FIG. 1.

Accordingly, in order to arrive at the camera design which enables the realization of the requirements of FIG. 1, a construction is necessary in which the diaphragm aperture ring, the shutter ring, and the distance setting ring of the camera are coupled with the light value ring, or a ring connected therewith, in such relative rotary positions that at a certain light value determined from the registry position of the indicators 11 and 7 the corresponding settings of diaphragm aperture, shutter speed, and distance setting are obtained. If, for example, in order to achieve registry between the indicators 11 and 7 the light value ring must be rotated through 36°, which corresponds to a light value of 16, the curves for diaphragm aperture, shutter time, and distance setting will indicate the values 20, 1/150, and 2.5, respectively. The thus adjusted values of diaphragm aperture and distance setting means a forward limit of the depth sharpness range of 1.1 meters, the rearward limit, as stated, being infinity. Thus, at said light value 16 and with the camera setting derived therefrom, portrait exposures may be made with the entire background to infinity sharply pictured.

On the other hand, if the indicators 7 and 11 are in register after a rotation of the light value ring through 4° which corresponds to a light value of 8.9, the setting of the camera will be a diaphragm aperture of 3.8, a shutter time of 1/30, and a distance setting of 10.4 meters with a near point value of 6.6 meters. At this light value and the corresponding settings it is not advisable to make portrait or group exposures (for group exposures an average distance of 3.5-4 meters is recommended), since the range of sharpness does not begin until at 6.6 meters.

For the adjustment of the film speed the diaphragm dial 17 is pressed downwardly against the action of a spring 30 so that the coupling 26, 27 will be released or disengaged. Upon rotation of the adjustment ring 1 the relative position of the dials 17 and 18 will be changed so that the adjusting mark 31 (in FIG. 3) can be adjusted to the desired film speed on the film speed dial 18. In case certain filter factors are to be considered a corresponding adjustment is effected by means of the filter scale 29. During this adjustment the cam disc 25 rests upon the stationary camera wall 32 (this position is illustrated in FIG. 2) so that simultaneously with said adjustment of the dial 18, the relative position of the follow-up indicator 7 on one hand and that the adjusting rings 1, 2, 3 and 4 on the other hand is changed in accordance with the respective setting of the film speed and the filter factors.

In order to adjust the inventive photographic camera for operation under exposure conditions, namely, when the adjusting rings 1, 2, 3 and 4 are coupled with each other, it is only necessary to bring the follow-up indicator 7 in registry with the indicator 11 of the exposure meter 8. In case of unfavorable light conditions it may become necessary to examine the position of the near point on the stationary dial 15 which cooperates with the indicating mark 42 on the adjusting ring 4.

Figure 6:
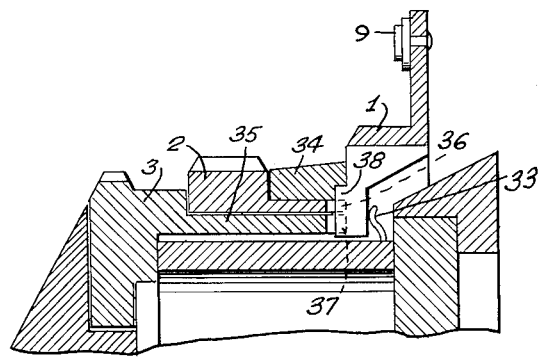
FIG. 6 is a sectional view along the optical axis of the coupling between the adjusting means for the shutter and the diaphragm.

The camera, according to this invention, can also be operated as a conventional camera, namely, when the couplings are in inoperative position so that the relationships illustrated in FIG. 1 no longer exist. For this purpose the follow-up indicator 7 is brought in registry with the indicator 11 of the exposure meter 8. The conventional diaphragm and shutter combination which are possible are then read off on the dials 16, 17 and are transferred to the dials 12 and 13. When the adjusting means are disengaged the lever 9 can be used as adjusting means for the exposure meter. The lever 9 (see FIGS. 2 and 6) is rigidly connected with the adjusting ring 1 and is pressed by means of the spring 33 towards the adjusting rings 2 and 3. These rings 2 and 3 are connected with the bars 34 and 35 which are provided with recesses 36 and 37. (See FIG. 6.) A projection 38 can enter the recesses 36 and 37 under the action of the spring 33. It will be noted (FIG. 6) that the projection 38 can enter the recesses 36 and 37 only in case all three adjusting means, namely, the adjusting rings 1, 2 and 3, are in a predetermined relationship to each other. This arrangement will eliminate the possibility that during adjustment of the device, when the couplings are in an inoperative position, any two adjusting means alone will accidentally come into a coupling engagement with each other.

Figure 7:
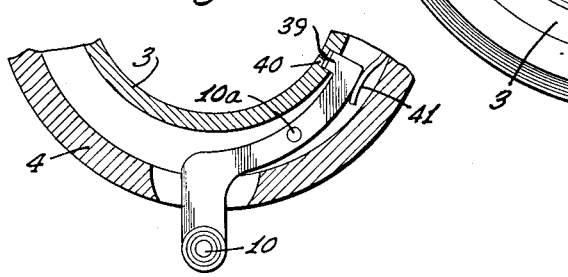
FIG. 7 is a sectional view at right angles to the optical axis of the coupling between the adjusting means for the diaphragm and the distance setting means.

FIG. 7 shows the coupling between the rings 3 and 4 which is actuated by the lever 10. The lever 10 is rotatably supported in the ring 4 at 10a, and is provided with a projection 39. The end of the lever 10 having the projection 39 is under the action of a spring 41, which will cause the projection 39 to enter the recess 40 provided in the ring 3, when the two adjusting rings 3 and 4 are in coupling engagement with each other.

The arrangement of the adjusting means permits also picture taking with flashlamps of predetermined light intensity, which flashlamps are arranged in close proximity to the camera housing 90. The adjusting means, namely the adjusting rings 2, 3, 4 for the diaphragm, the shutter and the distance setting means can be coupled with each other as indicated in FIG. 1, and only the adjustment of the distance setting means requires attention because when the adjusting rings 3 and 4 are coupled with each other the adjustment of the opening of the diaphragm changes with the square of the distance.

The arrangement of the different indicating scales is shown in FIG. 4. It will be observed that the index mark for the scale 43 of the exposure meter 8 and the one for the near point scale can be viewed only from the top, while the index marks on the shutter adjustment scale 12 for the diaphragm adjustment scale 13 and for the range finder dial 14 can be viewed only from the side of the camera. When photographing with the camera, when the respective adjusting means are coupled with each other and viewing the camera from the top, only the scales which are required during this phase of picture taking can be viewed, so that no mistakes can occur by accidental reading of the wrong scales.

Figure 8:
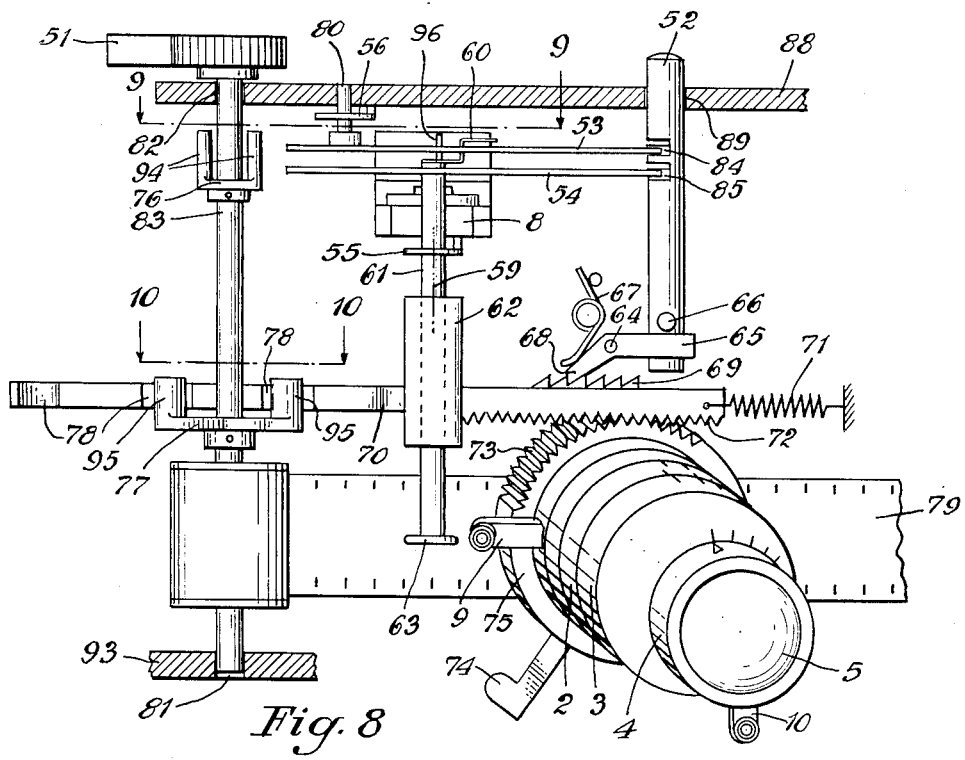
FIG. 8 shows diagrammatically the arrangement of another embodiment of a photographic camera according to the present invention, namely, a camera adjusted automatically by an exposure meter.
Figure 9:
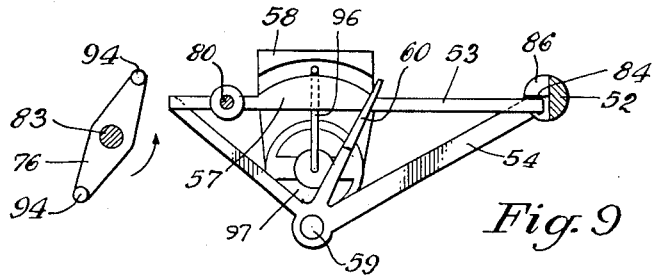
FIG. 9 is a sectional view along the line 9—9 in FIG. 8.
Figure 10:
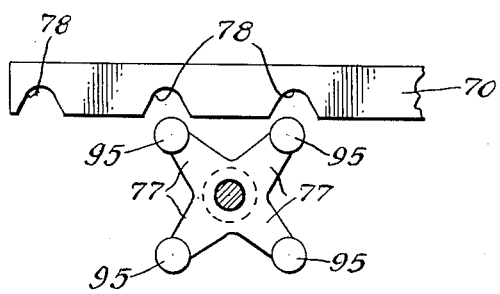
FIG. 10 is a sectional view along the line 10—10 in FIG. 8.

A further embodiment of the invention is shown in FIGS. 8, 9, and 10. In this embodiment the camera is automatically controlled by means of an automatic exposure meter 97. The camera is shown in a condition ready for taking a picture and the objective is directed towards or faces the object to be photographed. The indicator 96 of the exposure meter 97 is released and is in a position which corresponds to the prevailing light condition. The shutter is tensioned. The film 79 was previously advanced by the width of one picture frame, the adjusting rings 2, 3 and 4 are coupled with each other and are positioned relative to each other and adjusted according to the greatest end values according to the diagram in FIG. 1. When pressing downwardly the release rod 52, which is supported for movement in vertical direction at 89 in the top wall 88, of the camera housing, the following operations will be effected: An abutment shoulder 84 on the rod 52 releases a lever 53, which is supported in the bearing 80. The lever 53 is caused to rotate in counter clockwise direction under the action of the spiral spring 56. The rotation of the lever 53 continues until the part of the indicator 96 which is disposed between the segments 57 and 58, is stopped. Furthermore, due to the downward movement of the abutment shoulder 85, a lever 54, which is rotatably supported at 59, will be released and rotates under the action of the spring 55 in the same direction. The rotation of this lever 54 continues until the lever 60 which is connected to the lever 54 is stopped by a vertical part of the arrested indicator 96. The rotation of the spindle 61, which is rigidly connected to the lever 54 and cannot be displaced in axial direction, will move the spindle nut 62 which is not rotatable with its stop 63 in vertical direction. The lever 65 which is rotatably supported at 64, will be rotated in clockwise direction by a transverse projection 66 on the vertical release rod 52 against the action of a spring 67. This rotatable movement of the lever 65 will release the horizontal rod 70 which was locked by the toothed engagement of a pawl 68 with the rack teeth 69 on the rod 70. The rod 70 can now move to the right under the action of the spring 71. Such lengthwise movement of the rod 70 will cause the toothed segment 73 to rotate clockwise, because the latter meshes with the rack teeth 72, on said rod 70. The rotation of the segment 73 will continue until the projection 74, which is rigidly connected with the toothed segment 73, will engage the stop 63. The adjustment rings 2, 3 and 4 are coupled with each other by means of couplings actuated by the levers 9 and 10 and are also coupled with an adjustment ring 75 which is provided with the above mentioned toothed segment 73. The adjustment rings 2, 3 and 4 will thus be adjusted to a postion which corresponds to the prevailing lighting condition.

After the exposure of the film, the film-advancing means of the camera is operated by actuating the film advance lever 51 mounted on the shaft 83 which is supported in the bearings 81 and 82 disposed in the opposite walls 88 and 93 of the camera housing 90. This will prepare the camera for the next exposure. When this lever 51 is actuated the following operations will be effected: The lever 76 (FIG. 9), which rotates counter-clockwise will rotate by means of its roller-shaped projections 94 the levers 53 and 54 in clockwise direction. This movement will release the lever 60 from the indicator 11 of the exposure meter 8 and will thus release the indicator 11. Furthermore, the ends of the levers 53 and 54, disposed adjacent the release rod 52 will glide along the inclined surfaces 86 behind the abutment shoulders 84 and 85 and will be arrested at these points. At the same time the roller-shaped projections 95 of the cross-shaped lever 77 (FIG. 10) will engage the recesses 78 in the rod 70 and will move said rod 70 horizontally to the left against the action of the spring 71. This horizontal movement will effect a counter-clockwise rotation of the adjustment ring 75 by means of the teeth 72 and 73. This rotation of the adjustment ring 75 will operate the adjusting rings 2, 3 and 4 for setting the shutter, the diaphragm and the range finder into their respective end positions, corresponding to their highest adjusting values.

Although there have been shown and described particular embodiments of photographic cameras provided with the improvements of the present invention, it is to be understood that these embodiments are merely disclosed by way of examples and that changes and modifications may readily be made therein, by those skilled in the art, without departing from the spirit and scope of the invention.

What we claim is:

1. A photographic camera including a housing, an adjustable objective in said housing, a light intensity indicator, adjustable diaphragm means for adjusting the aperture of said objective, shutter means in said objective, distance setting means in the camera, adjusting means for said diaphragm, adjusting means for varying the speed of said shutter means, means for adjustment of said distance setting means, a first coupling means between said diaphragm adjusting means and said shutter speed adjusting means for simultaneous adjustment of the aperture of said diaphragm and the shutter speed, a second coupling means arranged between said diaphragm adjusting means and said distance setting adjusting means for simultaneous adjustment of said diaphragm and of the distance indicated by said distance setting means and means operatively connecting one of said adjusting means with said light intensity indicator so that in engaged position of said first and second coupling means each position of said light intensity indicator corresponds to a single predetermined relation between the objective aperture, the exposure time, and the distance setting, the coaction of said adjusting means for the diaphragm and the distance setting means relative to each other being such that, when said adjusting means are coupled together, the range of a substantial depth of focus will extend from a variable near point to infinity.

2. A photographic camera including a housing, an adjustable objective in said housing, diaphragm means for adjusting the aperture of said objective, shutter means, distance setting means in said housing, an exposure meter provided in said camera, adjusting means for said diaphragm, adjusting means for said shutter for setting the exposure time, means for adjusting said distance setting means, adjusting means for said exposure meter, coupling means for operatively connecting said diaphragm adjusting means and said shutter adjusting means with said adjusting means for said exposure meter for actuating said shutter adjusting means and said diaphragm adjusting means in dependence of the adjustment of said exposure meter, and a single actuating member provided in the camera adapted to simultaneously operate said coupling means between said adjusting means for the diaphragm, the shutter and said exposure meter, respectively, so that each position of said single actuating member corresponds to a single predetermined relation between the objective aperture, the exposure time, and the distance setting.

3. A photographic camera including a housing, an adjustable objective in said housing, diaphragm means for adjusting the aperture of said objective, shutter means in said objective, distance setting means in said housing, an exposure meter in said housing, adjusting means for said diaphragm, adjusting means for said shutter for setting the exposure time, means for adjusting said distance setting means, adjusting means for said exposure meter, an indicator device provided in the camera for determining the preferable relation between the adjusting means for the shutter and the adjusting means for the diaphragm, coupling means for operatively connecting said adjusting means for said diaphragm and the adjusting means for said shutter with said adjusting means for said exposure meter for actuating said shutter adjusting means and said diaphragm adjusting means in dependence of the adjustment of said exposure meter, and another coupling means for connecting said indicator device with said exposure meter for adjusting said exposure meter according to a predetermined relation between the respective adjustments of the shutter and the diaphragm as determined by said indicator device, whereby each position of said exposure meter corresponds to a single predetermined relation between the objective aperture, the exposure time, and the distance setting.

4. A photographic camera including a housing, an adjustable objective in said housing, diaphragm means for adjusting the aperture of said objective, shutter means in said objective, distance setting means in said housing, an exposure meter provided in said camera, adjusting means for said diaphragm, adjusting means for said shutter for setting the exposure time, means for adjusting said distance setting means, adjusting means for said exposure meter, an indicator device in the housing for producing a predetermined relation between the respective adjustments of the shutter and the diaphragm, movement transmission means in coacting relation between said adjusting means for said exposure meter, said adjusting means for said shutter and the adjusting means for said diaphragm, said movement transmission means being adapted to automatically actuate said adjusting means for said diaphragm and said adjusting means for said shutter in dependence of the adjustment of said exposure meter, and coupling means for connecting said indicator device with said exposure meter for positioning said adjusting means for the exposure meter according to a predetermined relation between the respective adjustments of the shutter, and the diaphragm as determined by said indicator device, whereby each position of said exposure meter corresponds to a single predetermined relation between the objective aperture, the exposure time, and the distance setting.

5. A photographic camera including a housing, an adjustable objective in said housing, diaphragm means for adjusting the aperture of said objective, shutter means in said objective, distance setting means in said housing, an exposure meter provided in said housing, adjusting and indicating means for said diaphragm, adjusting and indicating means for said shutter for setting the exposure time, means for adjusting said distance setting means, adjusting and indicating means for said exposure meter, and coupling means for operatively connecting said adjusting and indicating means for said diaphragm and said adjusting and indicating means for said shutter with said adjusting means for said exposure meter for actuating said shutter and diaphragm adjusting means in dependence of the adjustment of said indicating means of said exposure meter, all of said indicating and adjusting means being disposed in such a manner that the indicating and adjusting means necessary for picture taking are visible only from one predetermined viewing position, whereby each position of said exposure meter corresponds to a single predetermined relation between the objective aperture, the exposure time, and the distance setting.

6. A photographic camera including a housing, an adjustable objective in said housing, diaphragm means for adjusting the aperture of said objective, shutter means in said objective, distance setting means in said housing, and an exposure meter disposed in said housing, adjusting means for said diaphragm, adjusting means for said shutter means for setting the exposure time, means for adjusting said distance setting means, adjusting means for said exposure meter, adjusting means for determining the position of the near point, indicating means provided in the camera for all of said adjusting means, and releasable coupling means for operatively connecting all of said adjusting means for operation of the respective adjusting means for the diaphragm, the shutter, the range finder and the exposure meter in dependence of the setting of said distance setting means and said exposure meter, whereby each position of said exposure meter corresponds to a single predetermined relation between the objective aperture, the exposure time, and the distance setting.

7. A photographic camera including a housing, an adjustable objective mounted on said housing, a diaphragm for adjusting the aperture of said objective, a shutter in said objective for adjusting the exposure time of the camera, an exposure meter mounted in said housing, said exposure meter being provided with a movable pointer actuated in response to the light coming from the object to be photographed and including also a follow-up indicator adapted to be manually brought in registry with said movable pointer, a diaphragm adjusting ring, a shutter speed adjusting ring, a distance setting means adjusting ring and a rotatable and axially shiftable adjusting ring for said follow-up indicator, all of said adjusting rings being concentrically arranged about said objective, a first releasable coupling means including a pivotally mounted lever between said diaphragm adjusting ring and said distance setting means adjusting ring, and a second releasable coupling means between said diaphragm adjusting ring and said shutter speed adjusting ring, said second releasable coupling means being formed by a projection on said adjusting ring for said follow-up indicator, said second releasable coupling means in its operative position causing actuation of said diaphragm adjusting ring and said shutter speed adjusting ring when said adjusting ring for said follow-up indicator is manually rotated to move said follow-up indicator into registry with said movable pointer of said exposure meter, whereby each position of said exposure meter corresponds to a single predetermined relation between the objective aperture, the exposure time, and the distance setting.

8. A photographic camera according to claim 7, including a movement transmission gearing arranged between said rotatable and axially shiftable adjusting ring and said follow-up indicator, and means in said transmission gearing for adjusting the same to different film speed and indicating the film speed for which said transmission gearing has been adjusted.

9. A photographic camera including a housing, an adjustable objective in said housing, diaphragm means for adjusting the aperture of said objective, shutter means in said objective, adjusting means for said diaphragm, adjusting means for said shutter means for setting the exposure time, means for adjusting said objective to the desired distance, said three adjusting means extending concentrically about said objective, a first coupling means between said diaphragm adjusting means and said shutter adjusting means for simultaneous adjustment of the diaphragm and the shutter speed, and a second coupling means including a lever pivotally mounted on said objective adjusting means and arranged to engage said diaphragm adjusting means for simultaneously adjusting the diaphragm and the distance for which said objective is to be adjusted, whereby each position of said exposure meter corresponds to a single predetermined relation between the objective aperture, the exposure time, and the distance setting.

10. In a photographic camera of the type described having a light intensity indicator, means for adjusting the objective aperture, means for adjusting the exposure time, and means for adjusting the distance setting, the combination of first coupling means for locking said aperture adjusting means to said exposure time adjusting means in a predetermined position, second coupling means for locking said exposure time adjusting means to said distance setting adjusting means in a predetermined position, and means operatively connecting one of said adjusting means with said light intensity indicator so that in engaged position of said first and second coupling means each position of said light intensity indicator corresponds to a single predetermined relation between the objective aperture, the exposure time, and the distance setting.

11. The camera as set forth in claim 10, in which said connecting means and each of said three adjusting means include a substantially annular element rotatably mounted in concentric relation to the optical axis of the objective.

12. The camera as set forth in claim 10, including a first manually operable lever secured to said first coupling means, and a second manually operable lever secured to said second coupling means.

13. The camera as set forth in claim 10, including first yielding means associated with and biasing said first coupling means toward engaged position, and second yielding means associated with and biasing said second coupling means toward engaged position.

14. The camera as set forth in claim 10, including stationary stop means, and abutment means on one of said adjusting means in position to cooperate with said stationary stop means to limit movement of said three adjustment means, when locked together, in the direction of increasing objective aperture.

15. The camera as set forth in claim 10, in which said objective aperture adjusting means and said exposure time adjusting means are so constructed that their amount of movement in coupled position is at least approximately a linear function of the change in light intensity.

References Cited in the file of this patent

UNITED STATES PATENTS

| | | |
|---|---|---|
| 2,213,749 | Strauss | Sept. 3, 1940 |
| 2,242,013 | Martin | May 13, 1941 |
| 2,351,834 | Phillips | June 20, 1944 |
| 2,467,946 | Rossman | Apr. 19, 1949 |
| 2,536,500 | Hinden | Jan. 2, 1951 |

FOREIGN PATENTS

| | | |
|---|---|---|
| 179,192 | Austria | July 26, 1954 |
| 184,058 | Austria | Dec. 10, 1955 |
| 442,409 | Great Britain | Feb. 7, 1936 |
| 1,108,729 | France | Sept. 14, 1955 |
| 1,111,448 | France | Oct. 26, 1955 |

OTHER REFERENCES

Zeiss, German application, Serial No. Z 4899, printed March 8, 1956.